(12) United States Patent
Huang et al.

(10) Patent No.: US 11,917,163 B2
(45) Date of Patent: Feb. 27, 2024

(54) ROI-BASED VIDEO CODING METHOD AND DEVICE

(71) Applicant: SAMSUNG ELECTRONICS CO., LTD., Suwon-si (KR)

(72) Inventors: Wei Huang, Jiangsu (CN); Xianghu Chen, Jiangsu (CN); Yong Zhang, Jiangsu (CN); Junheng Wu, Jiangsu (CN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/571,721

(22) Filed: Jan. 10, 2022

(65) Prior Publication Data

US 2023/0045884 A1 Feb. 16, 2023

(30) Foreign Application Priority Data

Aug. 12, 2021 (CN) .......................... 202110925328.4

(51) Int. Cl.
*H04N 19/15* (2014.01)
*G06N 3/04* (2023.01)
*G06T 5/00* (2006.01)
*G06T 7/194* (2017.01)
*H04N 19/124* (2014.01)
*H04N 19/167* (2014.01)

(52) U.S. Cl.
CPC .............. *H04N 19/15* (2014.11); *G06N 3/04* (2013.01); *G06T 5/002* (2013.01); *H04N 19/124* (2014.11); *H04N 19/167* (2014.11)

(58) Field of Classification Search
CPC ...... H04N 19/00; H04N 19/15; H04N 19/124; H04N 19/167; G06T 7/194
See application file for complete search history.

(56) References Cited

U.S. PATENT DOCUMENTS

| 7,424,058 | B1 | 9/2008 | Staley et al. |
| 7,505,673 | B2 | 3/2009 | Kreiner et al. |
| 8,396,120 | B2 | 3/2013 | Hamilton et al. |
| 8,689,267 | B2 | 4/2014 | Hunt |

(Continued)

FOREIGN PATENT DOCUMENTS

| CN | 101605253 A | 12/2009 |
| CN | 102378065 A | 3/2012 |

(Continued)

OTHER PUBLICATIONS

Communication dated May 2, 2022 issued by the International Searching Authority in counterpart Application No. PCT/KR2022/000064 (PCT/ISA/220, PCT/ISA/210, and PCT/ISA/237).

(Continued)

*Primary Examiner* — Kyle M Lotfi
(74) *Attorney, Agent, or Firm* — Sughrue Mion, PLLC (57) ABSTRACT

A video recording method and a video recording device are provided. The method includes: obtaining video data to be recorded; dividing, based on the video data, each frame of the video data into a region of interest and a background region by using a preset neural network model; and encoding the region of interest of the video data based on a first encoding bit rate, and the background region based on a second bit rate, and storing the encoded video data into a storage device through a video buffer.

9 Claims, 4 Drawing Sheets

(56) References Cited

U.S. PATENT DOCUMENTS

| | | |
|---|---|---|
| 9,420,279 B2 | 8/2016 | Jang et al. |
| 10,027,966 B2 | 7/2018 | Chung |
| 2007/0097257 A1* | 5/2007 | El-Maleh ............. H04N 19/124 |
| | | 375/E7.184 |
| 2011/0299589 A1* | 12/2011 | Zhou .................... H04N 19/152 |
| | | 375/E7.126 |
| 2015/0016510 A1* | 1/2015 | Carlsson .............. H04N 19/198 |
| | | 375/240.03 |
| 2017/0094279 A1* | 3/2017 | Piramanayagam ...... G09G 5/10 |
| 2018/0176636 A1 | 6/2018 | Fang et al. |
| 2021/0168408 A1* | 6/2021 | Malakhov ............ H04N 19/167 |
| 2022/0021887 A1* | 1/2022 | Banerjee .............. H04N 19/167 |

FOREIGN PATENT DOCUMENTS

| | | |
|---|---|---|
| CN | 104301648 A | 1/2015 |
| CN | 108235107 A | 6/2018 |
| CN | 108702352 A | 10/2018 |
| CN | 111447449 A | 7/2020 |
| CN | 111479112 A | 7/2020 |
| KR | 10-0557618 B1 | 3/2006 |
| KR | 10-2010-0002632 A | 1/2010 |
| KR | 10-2011-0024971 A | 9/2011 |
| KR | 10-1647072 B1 | 8/2016 |
| KR | 10-2001415 B1 | 7/2019 |

OTHER PUBLICATIONS

Communication dated May 16, 2023, issued by the Chinese Intellectual Property Office in Chinese Application No. 202110925328.4.

\* cited by examiner

ROI-BASED VIDEO CODING METHOD AND DEVICE

CROSS-REFERENCE TO RELATED APPLICATION(S)

This application is based on and claims priority to Chinese Patent Application No. 202110925328.4, filed on Aug. 12, 2021, in the China National Intellectual Property Administration, the disclosure of which is incorporated by reference herein in its entirety.

TECHNICAL FIELD

The disclosure relates to the technical field of audio and video processing, in particular to a video recording method and device.

BACKGROUND ART

The advent of the 5G era stimulates the rollout of 5G promotion plans in many countries and regions around the world, which accelerates the commercial process of 5G. With the large-scale commercial use of 5G and the continuous evolution of the ultra-high definition video industry, 5G is expected to drive a leap forward in the application of the ultra-high definition video industry.

The ultra-high definition video is defined to have a picture resolution of 4K or higher. Compared with 4K, 8K technology is the ultra-high definition technology that is suitable for enhanced real-world visual experience, and receives much attention in the era of 5G, artificial intelligence (AI) and Internet of Things (IoT). The resolution of 8K is 7680×4320, and since full high definition (1920×1080) videos are called 1080P, 8K is called 4320P. Generally, it is called ultra-high definition 8K or 8K for short. By achieving breakthroughs in five dimensions, which are high resolution, high frame rate, high color depth, wide color gamut and high dynamic range, 8K may bring revolutionary immersive experience to the audience featuring greater infectivity.

At present, the research of 8K in the industry mainly focuses on video capture, video editing, content coding, content transmission, and so on. In terms of content coding, the AVS3 standard of 8 k content with 5G is expected to lead the global deployment. In terms of network transmission, compared with limited network bandwidth of 4G and Wi-Fi and insufficient mobility of wired transmission such as optical fiber, 5G will become the preferred transmission channel for ultra-high definition video services.

Meanwhile, the high bit rate of 8K videos brings new challenges to video recording by a personal video recorder (PVR). According to an existing video recording method, to record a TV program according to a TV video recording command, a PVR is generally used to obtain all packet identifiers (PID) of audios, videos, subtitles and other data of the TV program from a program map table (PMT) of the TV program, and the PVR sets each PID of the TV program to a demultiplexer (DEMUX) included therein. After recording is started, the DEMUX will move and filter the audios, videos, subtitles and other data to a TV storage device according to each PID of the program to be recorded.

In the related art, when the existing video recording method is used to record an ultra-high definition 8 k video, recording often fails due to the high bit rate of the 8 k video.

SUMMARY

One or more example embodiments of the disclosure provide a video recording method and a video recording device, which may solve the problem that the recording of a ultra-high definition video easily fails, without affecting the user's viewing experience.

According to an aspect of an example embodiment, provided is a method of recording a video, including: obtaining video data to be recorded; dividing, based on the video data, each frame of the video data into a region of interest and a background region by using a preset neural network model; and encoding, by using an encoder, the region of interest of the video data based on a first encoding bit rate, and the background region based on a second bit rate, and storing the encoded video data into a storage device through a video buffer, wherein the first encoding bit rate for the region of interest is determined to be greater than the second bit rate of the background region, and the encoding includes controlling an output bit rate of the encoder in real time based on a buffer status of the video buffer and an input/output (I/O) speed of the storage device.

The encoding may further include: determining the first encoding bit rate of the region of interest and the second encoding bit rate of the background region, based on a minimum encoding distortion degree being obtained under a condition that a current output bit rate of the encoder is less than or equal to a target output bit rate of the encoder; and encoding each coded data unit in the decoded video data based on the encoding bit rate of a region to which the coded data unit belongs, and obtaining coded data of the coded data unit.

The minimum encoding distortion degree may be obtained based on respective weight factors applied to an encoding distortion degree of each subregion of a frame, and a weight factor corresponding to the region of interest may be greater than a weight factor corresponding to the background region.

The controlling the output bit rate of the encoder may include: based on a current data volume in the video buffer being greater than a preset upper threshold and the I/O speed of the storage device being lower than a current output bit rate of the encoder, decreasing a target output bit rate of the encoder, wherein the preset upper threshold is less than a maximum storage capacity of the video buffer.

The controlling the output bit rate of the encoder may include: based on a current data volume in the video buffer being less than a preset lower threshold, increasing a target output bit rate of the encoder.

The encoding may further include: adjusting quantizer parameters (QPs) of the region of interest and the background region based on the determined corresponding encoding bit rates of the region of interest and the background region, wherein a QP of the region of interest is smaller than a QP of the background region.

The method may further include: preprocessing the decoded video data before encoding, and the preprocessing may include at least one of image enhancement processing of the region of interest, noise reduction processing of the background region, or buffing of the background region.

According to an aspect of an example embodiment, provided is a device for recording a video, including: a decoding unit configured to obtain video data to be recorded; a region-of-interest recognition unit configured to divide each frame of the video data into a region of interest and a background region based on the video data by using a preset neural network model; and an encoding unit configured to encode the video data based on a first encoding bit rate, and the background region based on a second bit rate, and store the encoded video data into a storage device through a video buffer, wherein the first encoding bit rate for the region of interest is determined to be greater than the second bit rate of the background region, and the encoding unit is further configured to control an output bit rate of the encoder in real time based on a buffer status of the video buffer and an I/O speed of the storage device.

The encoding unit may be further configured to cause the at least one processor to: determine the first encoding bit rate of the region of interest and the second encoding bit rate of the background region, based on a minimum encoding distortion degree being obtained under a condition that a current output bit rate of the encoder is less than or equal to a target output bit rate of the encoder; and encode each coded data unit in the decoded video data based on the encoding bit rate of a region to which the coded data unit belongs, and obtain coded data of the coded data unit.

The minimum encoding distortion degree may be obtained based on respective weight factors applied to an encoding distortion degree of each subregion of a frame, wherein a weight factor corresponding to the region of interest is greater than a weight factor corresponding to the background region.

The encoding unit may be further configured to cause the at least one processor to: based on a current data volume in the video buffer being greater than a preset upper threshold and the I/O speed of the storage device being lower than a current output bit rate of the encoder, decreasing a target output bit rate of the encoder, wherein the preset upper threshold is less than a maximum storage capacity of the video buffer.

The encoding unit may be further configured to cause the at least one processor to: based on a current data volume in the video buffer being less than a preset lower threshold, increasing a target output bit rate of the encoder.

The encoding unit may be further configured to cause the at least one processor to preprocess the decoded video data before encoding, the preprocessing including at least one of image enhancement processing of the region of interest, noise reduction processing of the background region, or buffing of the background region.

According to an aspect of an example embodiment, provided is an electronic device including a processor and a memory, wherein the memory is configured to store an application program executable by the processor to perform operations to obtain video data to be recorded; a region-of-interest recognition unit configured to divide each frame of the video data into a region of interest and a background region based on the video data by using a preset neural network model; and an encoding unit configured to encode the video data based on a first encoding bit rate, and the background region based on a second bit rate, and store the encoded video data into a storage device through a video buffer, wherein the first encoding bit rate for the region of interest is determined to be greater than the second bit rate of the background region, and the encoding unit is further configured to control an output bit rate of the encoder in real time based on a buffer status of the video buffer and an I/O speed of the storage device.

According to an aspect of an example embodiment, provided is a non-transitory computer readable storage medium having a computer readable instruction stored thereon, wherein the computer readable instruction is executable by at least one processor to perform: obtaining video data to be recorded; dividing, based on the video data, each frame of the video data into a region of interest and a background region by using a preset neural network model; and encoding, by using an encoder, the region of interest of the video data based on a first encoding bit rate, and the background region based on a second bit rate, and storing the encoded video data into a storage device through a video buffer, wherein the first encoding bit rate for the region of interest is determined to be greater than the second bit rate of the background region, and the encoding includes controlling an output bit rate of the encoder in real time based on a buffer status of the video buffer and an input/output (I/O) speed of the storage device.

BRIEF DESCRIPTION OF THE DRAWINGS

The above and other aspects, features, and advantages of example embodiments of the disclosure will be more apparent from the following description taken in conjunction with the accompanying drawings.

DETAILED DESCRIPTION

In order to make the object, technical solution and advantages of the disclosure clearer, the disclosure will be further described in detail below with reference to the drawings and example embodiments.

With respect to the terms used to describe in example embodiments, the general terms which are currently and widely used are selected in consideration of functions of structural elements in the example embodiments. However, meanings of the terms may be changed according to intention, a judicial precedence, the appearance of a new technology, and the like. In addition, in certain cases, a term which is not commonly used may be selected. In such a case, the meaning of the term will be described in detail at the corresponding portion in the description of the disclosure. Therefore, the terms used in the example embodiments of the disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er," "-or," and "unit" described in the specification mean units for processing at least one function and/or operation and may be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, the disclosure will now be described more fully with reference to the accompanying drawings, in which exemplary embodiments of the disclosure are shown such that one of ordinary skill in the art may easily work the disclosure. The disclosure may, however, be embodied in many different forms and should not be construed as being limited to the embodiments set forth herein.

In the related art, when recording an ultra-high definition (e.g., 8k) video, a recording failure occurs from the existing video (or video program) recording method due to the contradiction between a high bit rate of the video and a write bottleneck of a storage device. Specifically, in the process of video recording, a decoded original video needs to be re-encoded, and a bit rate of ultra-high definition video programs is very high. As such, a video data volume generated in unit time of the encoding link is very large. Since the encoded video data are cached in a video buffer rather than being immediately written into the storage device, if the video data in the video buffer are written into the storage device slowly, the video buffer will overflow, and then the encoded video data can no longer be written into the video buffer; as a result, the video data cannot be written to the storage device completely, resulting in a recording failure.

To address the above problem, according to an example embodiment of the disclosure, the output bit rate of the encoder may be controlled in real time based on the buffer status of the video buffer, the read/write speed of the storage device, and a current output bit rate of the encoder, so that the data overflow of the video buffer may be prevented. Additionally, according to an example embodiment, when encoding is performed by the encoder, bit rates may be configured for the region of interest (ROI) and the region of non-interest (that is, a background region) separately according to a rule such that the bit rate of the region of interest is greater than that of the region of non-interest. Accordingly, the user's experience of viewing the region of interest of a recorded video may not be affected when the output bit rate of the encoder is decreased, thus ensuring that the control of the output bit rate of the encoder does not significantly affect the user's video viewing experience.

Figure 1:
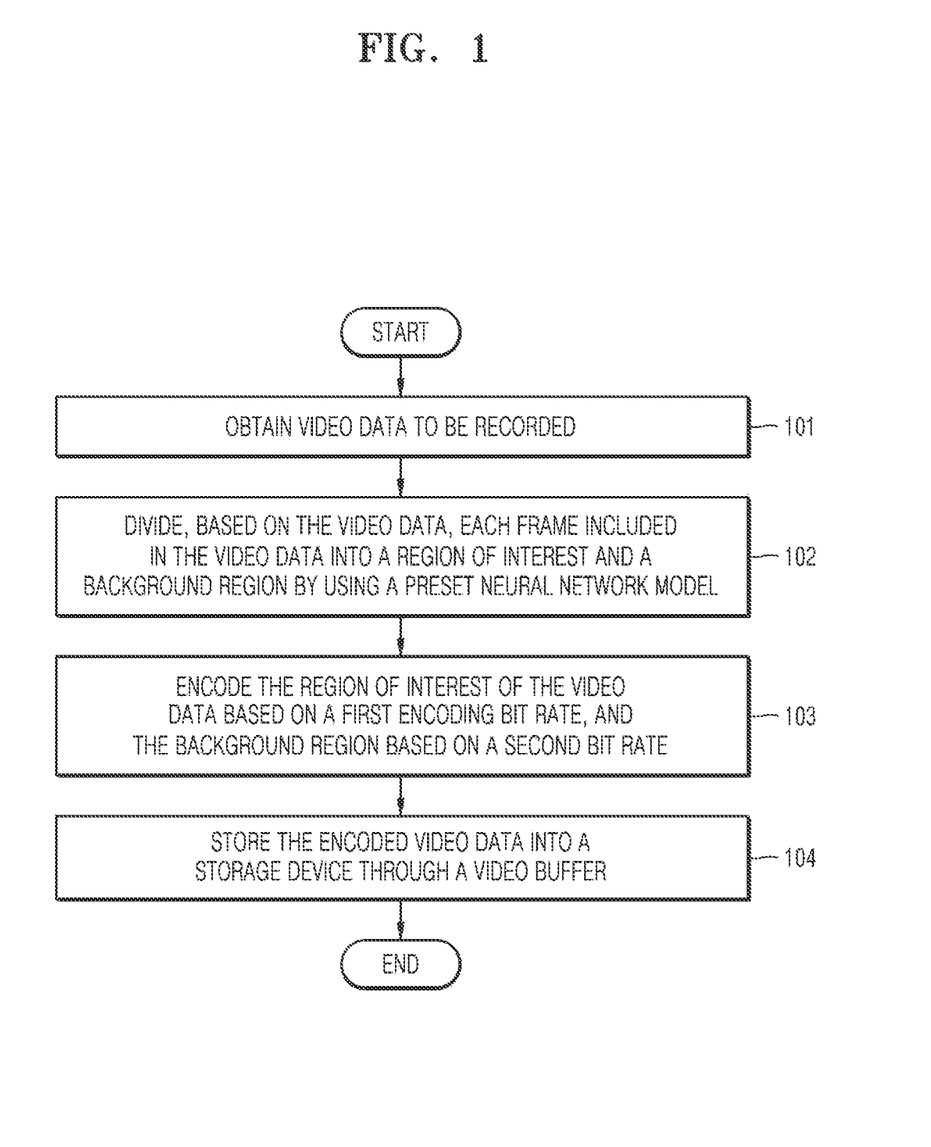
FIG. 1 is a flowchart of a method according to an example embodiment of the disclosure.

FIG. 1 is a flowchart of a video recording method according to an example embodiment of the disclosure. As shown in FIG. 1, the video recording method according to an example embodiment may include operations 101-104:

In operation 101, video data to be recorded is obtained. The video data may be obtained by decoding an original video data.

Here, the original video data are taken as input data for video recording (or program recording). The original video data may be video data transmitted to a video recording terminal through, for example, a 5G network, a satellite link, a cable TV network or the Internet. Particularly, the original video data may be encoded by existing video coding standards such as AVS/H.264 and AVS2/H.265, or by next generation ultra-high definition video coding standards such as AV3/VVC/H.266.

In operation 102, each frame of the video data is divided into a region of interest and a background region based on the decoded video data by using a preset neural network model.

This operation 102 is performed to identify the region of interest and the background region for each frame of the video data, and automatically generate a region of interest map for each frame, so that different regions may be encoded at different bit rates based on the region of interest map of each frame during subsequent encoding. Accordingly, it may be ensured that the control of the encoding bit rate does not affect the display effect of an image in the region of interest.

Here, an existing neural network model (CNN) for the identification of the region of interest may be used to process the video data to extract the region of interest and the region of non-interest, i.e. the background region. The region of interest is an image region selected from the frame, which is a key region for image analysis, and the region of interest may be, for example, a foreground region of the image or a partial area in the foreground region. The background region refers to the rest of the image region except the region of interest in the image picture.

Considering that users are generally interested in a human image or moving object in the video, human faces or the moving object may be used as the region of interest. However, the region of interest is not limited to human faces or the moving object, but may correspond to other objects.

The deep convolution neural network may use a visual geometry group 16 (VGG16) model or other network models to train a Faster recurrent CNN (R-CNN) model on a face data set (such as WIDER FACE), and then test the trained model on a face database (such as Face Detection Data Set and Benchmark (FDDB) data set).

In operation 103, the video data is encoded by an encoder according to the principle that an encoding bit rate of the region of interest is greater than that of the background region.

In operation 104, the encoded data is stored (written) into a storage device through a video buffer. An output bit rate of the encoder is controlled in real time based on a buffer status of the video buffer, an input/output (I/O) speed of the storage device, and a current output bit rate of the encoder. According to the embodiment of the present disclosure, the output bit rate of the encoder is controlled in time, so that data overflow of the video buffer may be prevented.

In this operation 104, during encoding, the output bit rate of the encoder needs to be controlled in real time based on the buffer status of the video buffer, the read/write speed (I/O speed) of the storage device, and a current output bit rate of the encoder, so that data overflow of the video buffer may be prevented, thereby avoiding the video recording failure caused by the data overflow of the video buffer.

It should be noted that video encoding may be evaluated according to subjective evaluation or objective evaluation. Objective evaluation determines which images produced by encoding of different encoders have better quality mainly based on some statistical characteristics, including objective evaluation indexes such as a peak signal to noise ratio (PSNR) and a mean square error (MSE). Objective evaluation is characterized by easy calculation and comparison, and is generally used as a reference for measuring encoding distortion to guide bit rate control. However, these objective evaluation indexes are not completely consistent with the characteristics of a human visual system (HVS). When users watch videos, the users typically pay more attention to some regions in a scene and pay less attention to other regions. For example, users pay more attention to faces in a conversational video. In this way, from the perspective of the human visual system, the definition of high-attention regions (or regions of interest) has a greater influence on the user's viewing experience, while the definition of low-attention regions (or regions of non-interest) has a smaller influence on the user's viewing experience.

Based on the above, considering that the decrease of the encoding bit rate will reduce the definition of the video and then affect the viewing experience, in order to minimize the influence of the control of the encoding bit rate on the user's viewing experience, in operation 102, when the video data are encoded, encoding bit rates are configured for the region of interest and the background region separately according to the principle that the encoding bit rate of the region of interest is greater than the encoding bit rate of the background region. This hybrid encoding method may give priority to the video encoding quality of the region of interest while moderately reducing the video encoding quality of the background region under the condition that the overall video bit rate is decreased, thus ensuring the playing effect of the video data while decreasing the video bit rate after hybrid encoding. Therefore, according to the embodiments of the disclosure, the problem of video recording failure may be solved by controlling the encoding bit rate, and at the same time, the subjective quality of the recorded program may be substantially maintained without upgrading the hardware of the storage device.

In an embodiment, in order to minimize the influence of the control of the encoding bit rate on the user's viewing experience, during encoding, the encoding bit rates of different regions may be determined based on the constraint of obtaining a minimum encoding distortion degree. For example, the decoded video data may be encoded by an encoder using the following operations x1 and x2.

Operation x1, according to the principle that the encoding bit rate of the region of interest is greater than the encoding bit rate of the background region, determining corresponding encoding bit rates of the region of interest and the background region when a minimum encoding distortion degree is obtained under the condition that an actual output bit rate of the encoder is less than or equal to a target output bit rate of the current encoder.

In this operation x1, the encoding bit rates of the region of interest and the background region may be determined according to the following formula (1).

$$\min\left(\sum_{i=1}^{m} w_i D_i\right) \text{ and } \sum_{i=1}^{m} R_i \leq R_{tar} \qquad \text{formula (1)}$$

Where wi is a preset weight factor of an ith subregion in the image, and the weight factor of the region of interest is greater than that of the background region; m is the number of subregions into which the image is divided; Di is an encoding distortion degree of the ith subregion, and Ri is the encoding bit rate of the ith subregion; and Rtar is the target output bit rate of the encoder. Specifically, subregion division may be performed based on tiles, that is, one subregion corresponds to one tile. However, the division may also adopt other encoding division granularity of a video encoding layer.

It should be noted that the higher the encoding bit rate, the smaller the distortion degree, and the smaller the encoding bit rate, the higher the distortion degree. In other words, the quality of the output of the encoder increases as the output bit rate of the encoder increases, but the chance of the video recording failure may increase as the output bit rate of the encoder increases. In the above formula, in order to make the encoding bit rate of the region of interest greater than the encoding bit rate of the background region, the weight factor of the region of interest is greater than the encoding bit rate of the background region, so that the distortion degree of the background region has a smaller influence on the distortion degree of the whole image. Therefore, by using the above formula (1) to determine the encoding bit rates of the region of interest and the background region, the encoding bit rate of the background region may be set smaller. In other words, the encoding bit rate of the background region may be set smaller and the encoding bit rate of the region of interest may be set greater than the encoding bit rate of the background region. Accordingly, the region of interest may obtain more coded data while the background region may obtain less coded data, and thus, priority is given to the image quality of the region of interest.

According to an example embodiment, the weight factors of the region of interest and the background region may be variously set according to actual needs, as long as the weight factor of the region of interest is greater than that of the background region.

Operation x2, encoding each coded data unit in the decoded video data according to the encoding bit rate of the region to which the coded data unit belongs, and obtaining coded data of the coded data unit. For example, the decoded video data may be encoded by existing video coding standards such as AVS/H.264 and AVS2/H.265, or by next generation ultra-high definition video coding standards such as AV3/VVC/H.266.

In an embodiment, to effectively and accurately avoid the recording failure by controlling the bit rate, the following operations y1 and y2 may be used to control the output bit rate of the encoder.

Operation y1, if a current data volume in the video buffer is greater than a preset upper threshold and the I/O (Input/Output) speed of the storage device is lower than an actual output bit rate of the encoder, decreasing a target output bit rate of the encoder, wherein the upper threshold is less than a maximum storage capacity of the video buffer.

Here, if the current data volume in the video buffer is greater than the preset upper threshold and the I/O speed of the storage device is lower than the actual output bit rate of the encoder, a large cached video data volume and a small writing speed of the storage device are indicated, and there is a risk that the storage space of the current video buffer may run out. In this case, it is needed to decrease the target output bit rate of the encoder to avoid the overflow of the video buffer, thus avoiding the video recording failure caused by buffer overflow.

The upper threshold is used to limit the timing of decreasing the target output bit rate of the encoder. If the upper threshold is set too small, the utilization rate of the buffer storage space may be affected, and the encoding bit rate of the recorded video may be too low. If the upper threshold is set too large, it may be difficult to avoid video buffer overflow by decreasing the target output bit rate of the encoder in time. In an embodiment, the appropriate value of the upper threshold may be set by those skilled in the art based on the above considerations in combination with the needs of application scenarios. For example, the upper threshold may be set to be 80% of the maximum storage capacity of the video buffer. However, this is merely an example and other values may be adopted as long as it is ensured that the overflow of the video buffer is avoided by decreasing the target output bit rate of the encoder in time.

In an embodiment, in the process of decreasing the target output bit rate of the encoder, the target output bit rate may be gradually lowered based on a preset step size. Specifically, the encoding bit rate may be adjusted by adjusting a quantizer parameter (QP). The quantization parameter QP reflects the compression of spatial details. The smaller the QP, the finer the quantization, the higher the image quality, and the longer a generated code stream. If the QP decreases, most of the details may be preserved. If the QP increases, some details may be lost, the bit rate may decrease, the distortion degree of the image may increase, and the quality may decrease. Taking an H.265/HEVC encoder as an example, the value range of the encoder QP is [0, 51], when QP is 0, it indicates that quantization is the finest, and on the contrary, when QP is 51, it means that quantization is the roughest. According to an embodiment, the QP of the region of interest may be smaller and a higher bit rate and a higher image quality may be obtained, and the QP of the region of interest may be greater and a lower bit rate and a lower image quality may be obtained.

Figure 4:
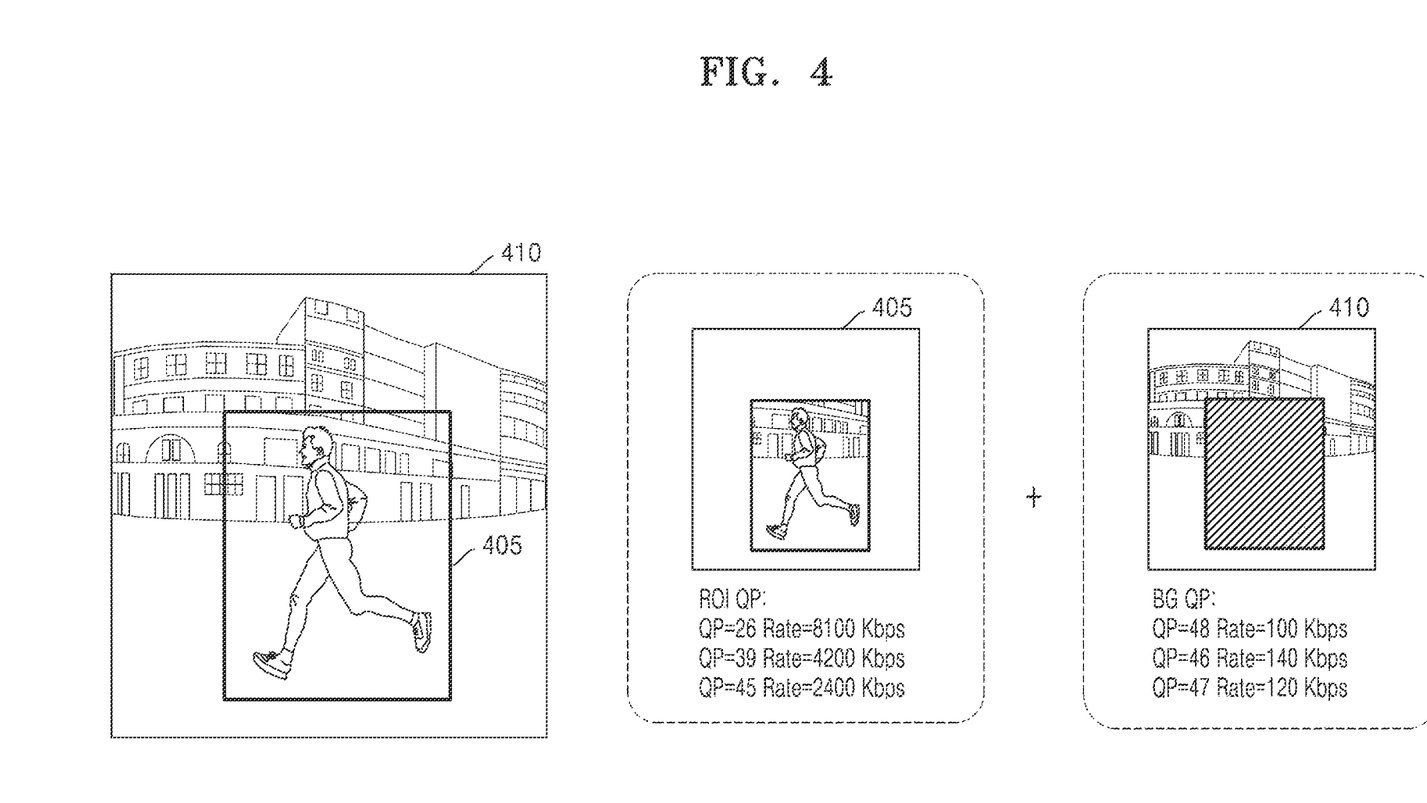
FIG. 4 illustrates an example of the quantization parameters for the region of interest and the region of background.

FIG. 4 illustrates an example of the quantization parameters for the region of interest and the region of background.

As mentioned above, each frame of the input video data is divided into a region of interest and a background region by using a preset neural network model. Referring to FIG. 4, an input frame 400 is divided into a region of interest 405 and a background region 410 by using a preset neural network model. The region of interest 405 and the background region 410 are encoded by an encoder according to the principle that the encoding bit rate of the region of interest 405 is greater than the encoding bit rate of the background region 410. Thus, during encoding, the output bit rate of the encoder needs to be controlled in real time so that the encoding bit rate (output bitrate after encoding) of the region of interest 405 is greater than the encoding bit rate (output bitrate after encoding) of the background region 410 as shown in FIG. 4. As the QP value increases, the output bitrate decreases, and as the QP value decreases, the output bitrate increases. Accordingly, a first QP applied to the region of interest 405 is determined to be smaller than a second QP applied to the background region 410 as shown in FIG. 4.

Operation y2, if the current data volume in the video buffer is less than a preset lower threshold, increasing the target output bit rate of the encoder, wherein the lower threshold is less than the upper threshold.

When it is monitored that the current data volume in the video buffer is less than the preset lower threshold, it means that the utilization rate of the video buffer is low and buffer overflow may not occur within a period of time. Therefore, in order to improve the quality of the recorded video as much as possible without causing a recording failure, the quality of the recorded video may be improved by increasing the target output bit rate of the encoder.

The lower threshold is used to limit the timing of increasing the target output bit rate of the encoder. If the lower threshold is set too small, increasing of the target output bit rate of the encoder may take place too late, so that the effect of improving video quality by increasing the bit rate is poor. If the lower threshold is set too large, it may easily lead to the ping-pong phenomenon of bit rate adjustment, that is, after the target output bit rate is increased, the cache usage may soon reach the upper threshold, thereby triggering the decrease of the target output bit rate, and as a result, bit rate control is frequently carried out between bit rate decrease and bit rate increase. In an embodiment, the appropriate value of the lower threshold may be set by those skilled in the art based on the above considerations in combination with the needs of application scenarios.

Specifically, when increasing the target output bit rate of the encoder, the target output bit rate may be gradually increased based on a preset step size.

In an embodiment, in order to further reduce the coded data volume while ensuring the subjective quality of the recorded video, the decoded video data are preprocessed before encoding, and then encoded based on a preprocessing result. For example, the preprocessing may comprise image enhancement processing of the region of interest, noise reduction processing of the background region, and/or buffing of the background region.

By using the above method, the image quality of the region of interest may be effectively improved and the subjective quality of the recorded video may be substantially maintained by performing image enhancement processing on the region of interest.

It should be noted that video noise is a common distortion introduced in the process of signal acquisition of the video. The subjective effect of the image may be enhanced by reducing noise intensity. In addition, the bit rate may not be wasted on encoding noise when images and videos are compressed, thus improving the encoding efficiency and reducing the coded data amount. Additionally, it may make the motion estimation in video encoding more accurate and make the entropy encoding speed faster. Specifically, existing noise reduction algorithms may be used for noise reduction, such as linear and/or nonlinear and spatial and/or frequency domain methods, and the frequency domain includes wavelet transform domain, Fourier transform domain or other transform domains. After de-noising or buffing the background region, more regions may become relatively low-frequency regions, so that the bit rate may be significantly decreased under the same PSNR or other objective index. Therefore, by de-noising or buffing the background region, higher image quality may be obtained with a lower bit rate, thus greatly reducing the impact of encoding bit rate control on the quality of the recorded video.

Specifically, the encoding result is written into the storage device through the video buffer, that is, the coded data are first written into the video buffer, and then the video data are read from the video buffer and written into the storage device.

In one embodiment, in order to ensure the writing quality of the video data, if the current encoded video data fail to be written into the storage device, re-writing of the corresponding data may be attempted. If the current encoded video data are successfully written, the next frame of video in the video buffer may be read and written.

In an embodiment, considering that the encoding and decoding of ultra-high definition (e.g., 8 k) videos require high computational power, in order to reduce the computational overhead of the video recording terminal, the encoding and decoding operation in the video recording process may be offloaded to a mobile edge computing (MEC) server by using the computational power of the MEC server, and an encoded video stream may be transmitted back by virtue of the characteristics of 5G low-delay data transmission, thus effectively reducing the requirements of video recording for the computational power of the hardware of a user terminal.

Based on the embodiments of the video recording method, in the process of encoding the currently recorded video data, the output bit rate of the encoder is controlled based on the buffer status of the video buffer, the read/write speed of the storage device, and a current output bit rate of the encoder in real time, and the bit rates are configured for the region of interest and the region of non-interest separately, so that the bit rate of the region of interest is greater than that of the region of non-interest, which solves the problem that the recording of ultra-high definition programs often fails, without increasing hardware cost or affecting the user's viewing experience.

Figure 2:
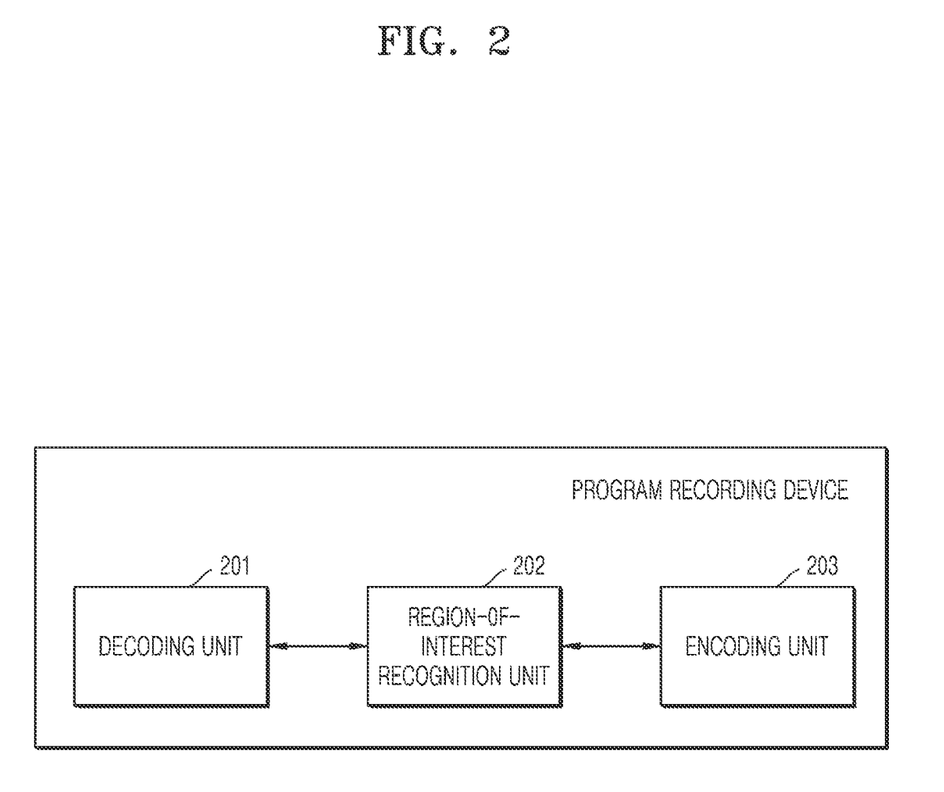
FIG. 2 is a structural diagram of a device according to an example embodiment of the disclosure.

Base on the embodiments of the video recording method, an embodiment of the disclosure further provides a video recording device. As shown in FIG. 2, a video recording device according to an example embodiment includes:
  a decoding unit 201 configured to decode original video data to be recorded;
  a region-of-interest recognition unit 202 configured to divide each frame of image of a corresponding video into a region of interest and a background region based on the decoded video data by using a preset depth neural network model; and an encoding unit 203 configured to encode the decoded video data by an encoder according to the principle that an encoding bit rate of the region of interest is greater than that of the background region, and writing an encoding result into a storage device through a video buffer, wherein an output bit rate of the encoder is controlled in real time based on a buffer status of the video buffer, an I/O speed of the storage device, and a current output bit rate of the encoder, so that data overflow of the video buffer may not occur.

The encoding unit 203 may be configured to encode the decoded video data by an encoder, by performing:

according to the principle that the encoding bit rate of the region of interest is greater than that of the background region, determining corresponding encoding bit rates of the region of interest and the background region when a minimum encoding distortion degree is obtained under the condition that an actual output bit rate of the encoder is less than or equal to a target output bit rate of the current encoder; and encoding each coded data unit in the decoded video data according to the encoding bit rate of the region to which the coded data unit belongs, and obtaining coded data of the coded data unit.

The encoding unit 203 may be configured to control the output bit rate of the encoder, by performing:

if a current data volume in the video buffer is greater than a preset upper threshold and the I/O speed of the storage device is lower than an actual output bit rate of the encoder, decreasing a target output bit rate of the encoder, wherein the upper threshold is less than a maximum storage capacity of the video buffer; and if the current data volume in the video buffer is less than a preset lower threshold, increasing the target output bit rate of the encoder, wherein the lower threshold is less than the upper threshold.

The encoding unit 203 may be further configured to preprocess the decoded video data before encoding, and the preprocessing comprises image enhancement processing of the region of interest, noise reduction processing of the background region, and/or buffing of the background region.

Figure 3:
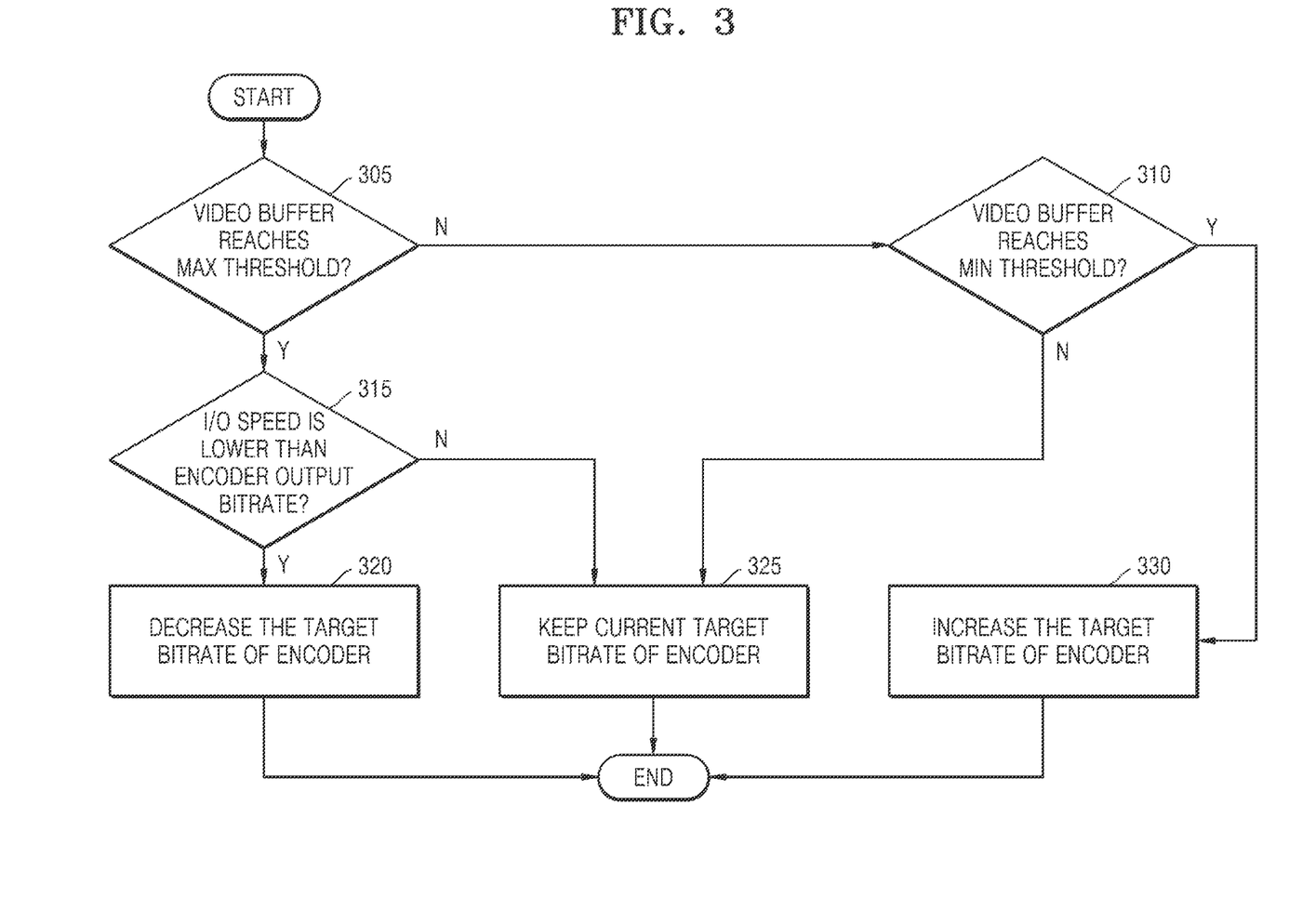
FIG. 3 is a flowchart of a rate control method according to an exemplary embodiment of the disclosure.

FIG. 3 is a flowchart of a rate control method according to an exemplary embodiment of the disclosure.

The target bitrate of the encoder is essentially important as it is the baseline bitrate that rate control algorithm can function upon. According to the embodiment, the target bitrate of the encoder may be determined based on the buffer size and storage device I/O speed. Additionally, the buffer is a dynamically coordinated with the encoder output bitrate and the current storage device I/O speed.

More specifically, while the buffer is receiving data from the encoder and writing data to the storage device, the buffer status, i.e. how full the buffer is, should be proactively provided as feedback to the target bitrate estimation process and consequently affects forthcoming encoding data rate. As an example, when the buffer is 90% full (considered as an alert level or a max threshold) and the current I/O speed is lower than the current encoder output bitrate, the target bitrate of the encoder may be decreased so that the target bitrate for the forthcoming encoder output does not make the buffer overflow. In another scenario where buffer is also 90% full but the current I/O speed is significantly greater than encoder output data rate, then the target bitrate either does not need to be changed or can even be increased to provide better video quality.

Referring to FIG. 3, in operation 305, it is determined whether the video buffer reaches Max threshold. In case that the video buffer does not reach Max threshold, then in operation 310, it is determined whether the video buffer reaches Min threshold. In case that the video buffer reaches Min threshold, then in operation 330, the target bitrate of the encoder is increased.

In case that it is determined the video buffer reaches Max threshold, in operation 315, it is determined whether the current I/O speed is lower than the current encoder output bitrate. In case that the current I/O speed is lower than the current encoder output bitrate, in operation 320, the target bitrate of the encoder is decreased. In case that the current I/O speed is not lower than the current encoder output bitrate, in operation 325, the current target bitrate of the encoder is maintained.

According to the video recording solution according to example embodiments of the disclosure, in the process of encoding the currently recorded video data, the output bit rate of the encoder is controlled in real time based on the buffer status of the video buffer, the read/write speed of the storage device, and a current output bit rate of the encoder, so as to avoid the data saturated overflow of the video buffer. In addition, during encoding, bit rates are configured for the region of interest and a region of non-interest separately according to the rule that the bit rate of the region of interest is greater than that of the region of non-interest, so that when the output bit rate of the encoder needs to be decreased, the image clarity of the region of interest is ensured. In this way, user's viewing experience is not affected, and the control of the output bit rate of the encoder may not affect the playing effect of the recorded program. Therefore, according to the example embodiments of the disclosure, the problem that the recording of ultra-high definition programs often fails may be solved, without increasing hardware cost or affecting the user's viewing experience.

Based on the above embodiments of the video recording method, an embodiment of the disclosure provides an electronic device for recording videos (or programs), which comprises a processor and a memory, wherein the memory stores an application program executable by the processor to perform the video recording method as described above. Specifically, a system or a device may be provided with a storage medium on which software program codes for performing the functions of any one of the above embodiments are stored, and a computer (or a central processing unit (CPU) or a microprocessor (MPU)) of the system or the device may read out and execute the program codes stored in the storage medium. In addition, part or all of the operations may be completed by an operating system on the computer based on instructions of the program codes. The program codes read from the storage medium may also be written into a memory arranged in an expansion board inserted into the computer or into a memory arranged in an expansion unit connected with the computer, and then part or all of the operations may be executed by a CPU installed on the expansion board or expansion unit based on the instructions of the program codes, thereby performing the functions of any one of the above embodiments of the video recording method.

The memory may be embodied as various storage media such as an electrically erasable programmable read only memory (EEPROM), a flash memory, and a programmable program read only memory (PROM). The processor may be implemented in one or more central processing units or one or more field programmable gate arrays (FPGAs), wherein the field programmable gate arrays integrate one or more central processing unit cores. Particularly, the central processing unit or the central processing unit core may be implemented as a CPU or a MCU.

An embodiment of the disclosure provides a computer program product, which comprises a computer program/instruction, and when the computer program/instruction is executed by a processor, the operations of video recording as described above are performed.

It should be noted that not all operations and modules in the above-mentioned processes and structural diagrams are necessary, and some operations or modules may be omitted according to actual needs. The execution order of the operations is not fixed and may be adjusted as needed. The division of the modules is only to facilitate the description of different functions. In actual implementation, one module may be implemented as multiple modules, the functions of multiple modules may also be realized by one module, and the modules may be located in the same device or different devices.

Hardware modules in various embodiments may be implemented by a mechanical or electronic means. For example, a hardware module may comprise specially designed permanent circuits or logic devices (such as special-purpose processors, e.g., an FPGA or an application specific integrated circuit (ASIC)) for performing specific operations. The hardware module may also comprise programmable logic devices or circuits (such as general purpose processors or other programmable processors) temporarily configured by software for performing specific operations. Whether the hardware modules are implemented by a mechanical means, a special permanent circuit or a temporarily configured circuit (such as configured by software) may be decided by taking consideration of cost and time.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above embodiments may be implemented in algorithms that execute on one or more processors. Furthermore, the components, elements or units represented by a block or processing operations may employ any number of related art techniques for electronics configuration, signal processing and/or control, data processing and the like.

For the sake of conciseness, only the parts related to the disclosure are schematically shown in each drawing, and they do not represent the actual structure of the product. Herein, "schematic" means "serving as an instance, example or explanation". In addition, in order to make the drawings simple and easy to understand, in some figures, only one of the components with the same structure or function is shown schematically, or only one of them is marked. Herein, "one" does not mean to limit the number of relevant parts of the disclosure to "only one", and "one" does not mean to exclude the situation that the number of relevant parts of the disclosure is "more than one". Herein, "upper", "lower", "front", "rear", "left", "right", "inner", "outer" and so on are only used to express the relative positional relationship among related parts, but not to limit the absolute positions of these related parts.

The above embodiments are only example embodiments of the disclosure and are not intended to limit the scope of protection of the disclosure. Any modifications, equivalent substitutions and improvements made within the spirit and principles of the disclosure shall be included in the scope of protection of the following claims and their equivalents.

The invention claimed is:

1. A method of recording a video, comprising:
   obtaining video data to be recorded;
   dividing, based on the video data and by using a preset neural network model, each frame of the video data into a plurality of subregions, the plurality of subregions including subregions included in a region of interest and subregions included in a background region;
   determining a first encoding bit rate of the region of interest and a second encoding bit rate of the background region, such that a sum of encoding distortion degrees of the plurality of subregions of a frame based on the first encoding bit rate and the second encoding bit rate is minimum under a condition that an encoding bit rate of each subregion is less than or equal to a target output bit rate of an encoder, wherein the target output bit rate is increased or decreased, in real time, based on a buffer status of a video buffer and an input/output (I/O) speed of a storage device;
   encoding the region of interest of the video data based on the first encoding bit rate, and the background region based on the second encoding bit rate; and
   storing the encoded video data into the storage device through the video buffer,
   wherein the first encoding bit rate for the region of interest is determined to be greater than the second encoding bit rate of the background region,
   wherein the encoding comprises controlling an output bit rate of the encoder in real time based on an increase or a decrease of the target output bit rate, and
   wherein the target output bit rate is controlled such that:
   the target output bit rate is decreased based on a current data volume in the video buffer being greater than a preset upper threshold and the I/O speed of the storage device being lower than a current output bit rate of the encoder, wherein the preset upper threshold is a preset percentage of a maximum storage capacity of the video buffet;
   the target output bit rate is increased based on the current data volume in the video buffer being less than a preset lower threshold; and
   the target output bit rate is maintained based on the current data volume in the video buffer being greater than the preset lower threshold and less than the preset upper threshold, or based on the current data volume in the video buffer being greater than the preset upper threshold and the I/O speed of the storage device being equal to or greater than the current output bit rate of the encoder.

2. The method according to claim 1, wherein a minimum encoding distortion degree is obtained based on respective weight factors applied to an encoding distortion degree of each subregion of the frame, and a weight factor corresponding to the region of interest is greater than a weight factor corresponding to the background region.

3. The method according to claim 1, wherein the encoding further comprises:
adjusting quantizer parameters (QPs) of the region of interest and the background region based on the determined corresponding encoding bit rates of the region of interest and the background region, wherein a QP of the region of interest is smaller than a QP of the background region.

4. The method according to claim 1, further comprising: preprocessing the video data before encoding, wherein the preprocessing comprises at least one of image enhancement processing of the region of interest, noise reduction processing of the background region, or buffing of the background region.

5. A device for recording a video, comprising at least one processor to implement:
a decoding unit configured to obtain video data to be recorded;
a region-of-interest recognition unit configured to divide, based on the video data by using a preset neural network model, each frame of the video data into a plurality of subregions, the plurality of subregions including subregions included in a region of interest and subregions included in a background region; and
an encoding unit configured to:
determine a first encoding bit rate of the region of interest and a second encoding bit rate of the background region, such that a sum of encoding distortion degrees of the plurality of subregions of a frame based on the first encoding bit rate and the second encoding bit rate is minimum under a condition that an encoding bit rate of each subregion is less than or equal to a target output bit rate of an encoder, wherein the target output bit rate is increased or decreased, in real time, based on a buffer status of a video buffer and an input/output (I/O) speed of a storage device; and
encode the video data based on the first encoding bit rate, and the background region based on the second encoding bit rate, and store the encoded video data into the storage device through the video buffer,
wherein the first encoding bit rate for the region of interest is determined to be greater than the second encoding bit rate of the background region, and the encoding unit is further configured to control an output bit rate of the encoder in real time based on an increase or a decrease of the target output bit rate, and
wherein the target output bit rate is controlled such that:
the target output bit rate is decreased based on a current data volume in the video buffer being greater than a preset upper threshold and the I/O speed of the storage device being lower than a current output bit rate of the encoder, wherein the preset upper threshold is a preset percentage of a maximum storage capacity of the video buffet;
the target output bit rate is increased based on the current data volume in the video buffer being less than a preset lower threshold; and
the target output bit rate is maintained based on the current data volume in the video buffer being greater than the preset lower threshold and less than the preset upper threshold, or based on the current data volume in the video buffer being greater than the preset upper threshold and the I/O speed of the storage device being equal to or greater than the current output bit rate of the encoder.

6. The device according to claim 5, wherein a minimum encoding distortion degree is obtained based on respective weight factors applied to an encoding distortion degree of each subregion of the frame, and a weight factor corresponding to the region of interest is greater than a weight factor corresponding to the background region.

7. The device according to claim 5, wherein the encoding unit is further configured to perform preprocessing the video data before encoding, the preprocessing comprising at least one of image enhancement processing of the region of interest, noise reduction processing of the background region, or buffing of the background region.

8. An electronic device comprising a processor and a memory,
wherein the memory is configured to store an application program executable by the processor to perform
obtaining video data to be recorded;
dividing, based on the video data and by using a preset neural network model, each frame of the video data into a plurality of subregions, the plurality of subregions including subregions included in a region of interest and subregions included in a background region;
determining a first encoding bit rate of the region of interest and a second encoding bit rate of the background region, such that a sum of encoding distortion degrees of the plurality of subregions of a frame based on the first encoding bit rate and the second encoding bit rate is minimum under a condition that an encoding bit rate of each subregion is less than or equal to a target output bit rate of an encoder, wherein the target output bit rate is increased or decreased, in real time, based on a buffer status of a video buffer and an input/output (I/O) speed of a storage device;
encoding the region of interest of the video data based on the first encoding bit rate, and the background region based on the second encoding bit rate;
storing the encoded video data into the storage device through the video buffer,
wherein the first encoding bit rate for the region of interest is determined to be greater than the second encoding bit rate of the background region,
wherein the encoding comprises controlling an output bit rate of the encoder in real time based on an increase or a decrease of the target output bit rate, and
wherein the target output bit rate is controlled such that:
the target output bit rate is decreased based on a current data volume in the video buffer being greater than a preset upper threshold and the I/O speed of the storage device being lower than a current output bit rate of the encoder, wherein the preset upper threshold is a preset percentage of a maximum storage capacity of the video buffet;
the target output bit rate is increased based on the current data volume in the video buffer being less than a preset lower threshold; and the target output bit rate is maintained based on the current data volume in the video buffer being greater than the preset lower threshold and less than the preset upper threshold, or based on the current data volume in the video buffer being greater than the preset upper threshold and the I/O speed of the storage device being equal to or greater than the current output bit rate of the encoder.

9. A non-transitory computer readable storage medium having a computer readable instruction stored thereon, wherein the computer readable instruction is executable by at least one processor to perform:

obtaining video data to be recorded;

dividing, based on the video data and by using a preset neural network model, each frame of the video data into a plurality of subregions, the plurality of subregions including subregions included in a region of interest and subregions included in a background region;

determining a first encoding bit rate of the region of interest and a second encoding bit rate of the background region, such that a sum of encoding distortion degrees of the plurality of subregions of a frame based on the first encoding bit rate and the second encoding bit rate is minimum under a condition that an encoding bit rate of each subregion is less than or equal to a target output bit rate of an encoder, wherein the target output bit rate is increased or decreased, in real time, based on a buffer status of a video buffer and an input/output (I/O) speed of a storage device;

encoding the region of interest of the video data based on the first encoding bit rate, and the background region based on the second encoding bit rate;

storing the encoded video data into the storage device through the video buffer, wherein the first encoding bit rate for the region of interest is determined to be greater than the second encoding bit rate of the background region, wherein the encoding comprises controlling an output bit rate of the encoder in real time based on an increase or a decrease of the target output bit rate, and wherein the target output bit rate is controlled such that:

the target output bit rate is decreased based on a current data volume in the video buffer being greater than a preset upper threshold and the I/O speed of the storage device being lower than a current output bit rate of the encoder, wherein the preset upper threshold is a preset percentage of a maximum storage capacity of the video buffet;

the target output bit rate is increased based on the current data volume in the video buffer being less than a preset lower threshold; and the target output bit rate is maintained based on the current data volume in the video buffer being greater than the preset lower threshold and less than the preset upper threshold, or based on the current data volume in the video buffer being greater than the preset upper threshold and the I/O speed of the storage device being equal to or greater than the current output bit rate of the encoder.

* * * * *